United States Patent Office 3,325,528
Patented June 13, 1967

3,325,528
TRIALLYL ETHERS OF DIOXABORINANE
Richard B. Lund, Whippany, and Arleen C. Pierce, Parsippany, N.J., assignors to Allied Chemical Corporation, New York, N.Y., a corporation of New York
No Drawing. Filed Mar. 6, 1964, Ser. No. 350,108
2 Claims. (Cl. 260—462)

This invention relates to novel borinane compounds and the preparation thereof. More particularly this invention relates to triallyl ethers of dioxaborinane and a process for their preparation.

The triallyl ethers of dioxaborinane within the scope of the present invention are represented by the following formula:

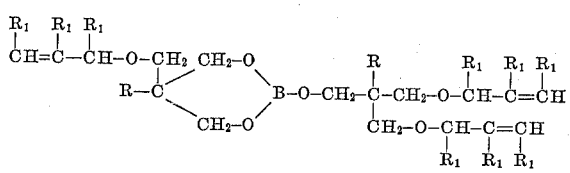

wherein each R is independently an alkyl group which preferably contains 1–5 carbon atoms and each $R_1$ is independently a group selected from the class consisting of hydrogen and alkyl groups, the latter of which preferably contains 1–5 carbon atoms. These compounds are useful as stabilizers for polymeric compositions against the effect of elevated temperatures, and are particularly effective as stabilizers for chlorinated organic compounds.

It is therefore an object of the present invention to provide novel borinane compounds and a method for their preparation.

Another object of the present invention is to provide novel triallyl ethers of dioxaborinane.

Additional objects and advantages of this invention will become apparent from the following detailed description thereof.

In accordance with the present invention novel triallyl ethers of dioxaborinane are prepared by the reaction of a monoallyl ether of dioxaborinane with a 1,3-diallyloxy-2-alkyl-2-hydroxymethylpropane as illustrated in the following equation:

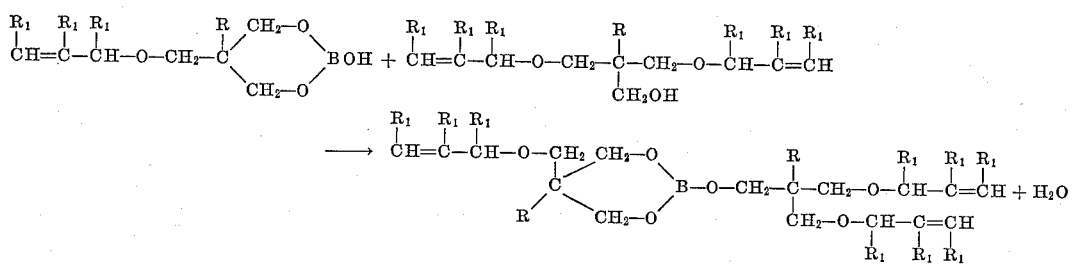

wherein R and $R_1$ have the meanings given above. The water formed in the reaction should be removed or the reaction will not go to completion. The water can be distilled off by conducting the reaction at a temperature of at least 100° C. or by carrying out the reaction at reflux temperature in a solvent which forms an azeotropic mixture with water. If a solvent is used, it should, of course, not interfere with the reaction and it should preferably have a boiling point of at least 100° C. in order to avoid an excessively slow reaction rate. The water can also be removed by refluxing the reaction mixture in the presence of an inert drying agent such as magnesium sulfate.

The monoallyl ethers of dioxaborinane used as reactants in the present invention can be prepared from boric acid and an allyloxy-substituted dihydric alcohol, in accordance with the following equation:

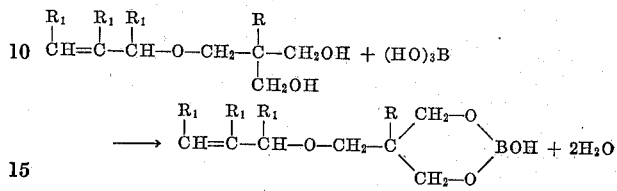

wherein R and $R_1$ have the meanings given above. The water formed in this reaction should be removed. It is not necessary to isolate the resulting monoallyl ether of dioxaborinane, but rather after the boric acid and allyloxy substituted dihydric alcohol have reacted, the 1,3-diallyloxy-2-alkyl-2-hydroxymethylpropane used to produce the compounds of the invention can be added directly to the reaction mixture.

The following compounds are illustrative of the novel triallyl ethers of dioxaborinane of the present invention: 2 - (2',2' - diallyloxymethyl propoxy) - 5 - allyloxymethyl - 5 - ethyl - 1,3,2 - dioxaborinane; 2 - (2',2'-diallyloxymethyl butoxy) - 5 - allyloxymethyl - 5 - ethyl - 1,3,2 - dioxaborinane; 2-(2',2'-diallyloxymethyl butoxy)-5-allyloxymethyl - 5 - butyl - 1,3,2 - dioxaborinane; 2 - [2',2'-bis(1,2,3 - trimethylallyloxymethyl) butoxy] - 5 - allyloxymethyl-5-ethyl-1,3,2-dioxaborinane; and 2-[2'-2'-bis(1,2,3 - trimethylallyloxymethyl)butoxy] - 5 - (1,2,3 - trimethylallyloxymethyl) - 5 - ethyl - 1,3,2 - dioxaborinane. The above listed compounds are merely given for illustrative purposes, and it will be obvious that many additional compounds are within the scope of the present invention.

The compounds of the present invention can be used for the stabilization of polymeric compositions against the effect of elevated temperatures, and are particularly effective in stabilizing chlorinated organic compounds, such as chlorinated polyethylene. When used as stabilizers for chlorinated polyethylene, the dioxaborinane compounds of this invention should be added to the polymer in amount equal to at least 0.5% by weight of the polymer and preferably in an amount equal to about 1.0–10% by weight of the polymer. In a typical example it was found that the addition to chlorinated polyethylene of 4% by weight of 2 - (2',2' - diallyloxymethyl butoxy) - 5 - allyloxymethyl-5-ethyl-1,3,2-dioxaborinane substantially decreased the crosslinking of the polymer resulting from treatment at 200° C. for 1 hour.

The following example is given to further illustrate the invention, but it is to be understood that the invention is not to be limited in any way by the detailed description therein.

*Example*

17.4 parts by weight trimethylolpropane monoallyl ether were mixed with 6.2 parts by weight boric acid and heated under reflux until 3.6 parts by weight water were collected in a Dean Stark trap. There was then added to the reaction mixture 21.4 parts by weight trimethylolpropane diallyl ether and heating was continued until the reaction subsided. The product thus produced was confirmed to be 2 - (2′,2′ - diallyloxymethyl butoxy) - 5 - allyloxymethyl-5-ethyl-1,3,2-dioxaborinane, by its infrared spectrum.

It will be apparent that many modifications and variations may be effected without departing from the scope of the novel concepts of the present invention, and the illustrative details disclosed are not to be construed as imposing undue limitations on the invention.

We claim:

1. A compound of the formula:

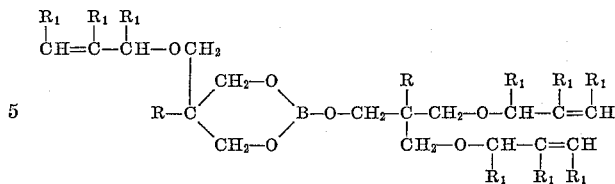

wherein each R is independently an alkyl group of 1–5 carbons and each $R_1$ is independently a member selected from the group consisting of hydrogen and alkyl of 1–5 carbon atoms.

2. 2 - (2′,2′ - diallyloxymethyl butoxy) - 5 - allyloxymethyl-5-ethyl-1,3,2-dioxaborinane.

References Cited

UNITED STATES PATENTS 2,994,713   8/1961   Lane _____ 260—462

CHARLES B. PARKER, *Primary Examiner.*

DELBERT R. PHILLIPS, *Assistant Examiner.*